United States Patent [19]

Chevion et al.

[11] Patent Number: 5,182,656

[45] Date of Patent: Jan. 26, 1993

[54] METHOD FOR COMPRESSING AND DECOMPRESSING FORMS BY MEANS OF VERY LARGE SYMBOL MATCHING

[75] Inventors: Dan S. Chevion, Haifa; Ehud D. Karnin; Eugeniusz Walach, both of Kiryat Motzkin, all of Israel

[73] Assignee: International Business Machines Corporation, Armonk, N.Y.

[21] Appl. No.: 559,813

[22] Filed: Jul. 30, 1990

[30] Foreign Application Priority Data

Aug. 4, 1989 [IL] Israel .......................................... 91220

[51] Int. Cl.$^5$ .............................................. H04N 1/40
[52] U.S. Cl. .................................... 358/452; 358/450; 358/462
[58] Field of Search ............... 358/403, 429, 434, 444, 358/450, 452, 455, 462, 464, 465, 401, 471, 473, 426, 431, 467

[56] References Cited

U.S. PATENT DOCUMENTS 4,430,526 2/1984 Brown et al. ........................ 178/18
4,542,411 9/1985 Imanaka et al. ..................... 358/430
5,001,769 3/1991 Reid-Green et al. ................ 358/452

FOREIGN PATENT DOCUMENTS 0059240 2/1981 European Pat. Off. .
0202671 5/1985 European Pat. Off. .
0245027 5/1986 European Pat. Off. .
0247788 5/1986 European Pat. Off. .
0262462 9/1986 European Pat. Off. .
0076969 5/1982 Japan .................................... 358/452

Primary Examiner—Edward L. Coles, Sr.
Assistant Examiner—Jerome Grant, II
Attorney, Agent, or Firm—Joscelyn G. Cockburn

[57] ABSTRACT

This method relates to the compression of information contained in filled-in forms (O) by separate handling of the corresponding empty forms (CP) and of the information written into them (VP). Samples of the empty forms are pre-scanned, the data obtained digitized and stored in a computer memory to create a forms library. The original, filled-in form (O) to be compressed is then scanned, the data obtained digitized and the retrieved representation of the empty form (CP) is then subtracted, the difference being the digital representation of the filled-in information (VP), which may now be compressed by conventional methods or, preferably, by an adaptive compression scheme using at least two compression ratios depending on the relative content of black pixels in the data to be compressed.

13 Claims, 7 Drawing Sheets

| שם האורח | המלון המבוקש (רמה) | סוג החדר | מתאריך | עד תאריך | דרישות מיוחדות והערות |
|---|---|---|---|---|---|
| | | | | | |
| | | | | | |
| | | | | | |
| | | | | | |

METHOD FOR COMPRESSING AND DECOMPRESSING FORMS BY MEANS OF VERY LARGE SYMBOL MATCHING

DESCRIPTION

This invention relates to a method for compressing and decompressing image information, in particular in cases where part of the image is invariant or standard, such as in printed forms and, thus, does not contribute to the information content. The inventive method employs the matching of pre-recorded data representing the said standard information with the image information obtained from scanning the image in question.

The handling of paper documents is a daily routine in today's office environments. Considerations having to do with the care for the natural resources required for manufacturing the paper used for the documents, the speed of preparing and handling the documents to make them serve their purpose, and their storage and possible later retrieval, have resulted in efforts to reduce the number of documents circulated and to leave the working with the documents to automatic record handling devices. The physical handling of the documents is one important aspect in this connection, the other, possibly more important aspect is the treatment of the information contained in the documents.

The treatment of the information contained in documents generally involves the acquisition of the information by some reading device, the transformation of the acquired information into a machine-readable code, the storing of the coded information for later, and possibly repeated processing, the actual processing of the information, and finally the output of the results of the processing. This output may take visual form, as on a display unit, or in print, or be purely electronic.

The acquisition of the information by a reading device, such as an optical scanner, should be performed with a reasonably high resolution lest the information content should become mutilated or partially lost. Accordingly, the reading device will produce a high volume of scan data which in turn require a large memory capacity for storage. As a typical example, a page of the A4 size (279×210 mm), scanned at 100 pels/cm (where "pel" stands for picture element and is either a white or black dot), requires about 700 kBytes of storage space. Even a rather modest number of documents, say a couple of thousands, would call for an unreasonably big memory.

To alleviate this problem, known document scanning systems are provided with data compression routines which save about one order of magnitude so that the compressed data of a scanned A4 page can be accommodated on 25 to 75 kBytes of storage space, depending, of course, on the content of the scanned image. Very clever algorithms, based on arithmetic coding, can achieve a further reduction of about 16%. If goes without saying that any compression system must permit later decompression of the information, be it for processing or output.

In a number of applications where very large volumes of documents must be handled, such as, e.g., in connection with a census, it is essential to further increase the compression ratio quite significantly, say by another order of magnitude.

One possible approach to this problem is described in "Combined Symbol Matching Facsimile Data Compression System" by W. K. Pratt, P. J. Capitant, W. Chen, E. R. Hamilton and R. H. Wallis, in Proc. IEEE, Vol. 68, No. 7, July 1980. There it was proposed to feed binary images into a character matching process. Recognized characters will be represented very efficiently by means of their alphanumeric form. Then the remaining residue information will be compressed separately as a conventional binary image. This amounts to an about two-fold increase in compression ratio, although the efficiency of this scheme largely depends on the percentage of recognized characters and on the degree of digitization noise.

An improved technique is disclosed in U.S. Pat. No. 4,499,499 Brickman et al., where instead of single character recognition the matching of large symbols, such as individual words in the text, is considered. No attempt is, however, proposed to consider larger symbols than words for compression. Accordingly, this reference fails to disclose a method that would enable compression up to a satisfactory radio.

It is an object of the present invention to propose a method for the compression of image data with a compression ratio considerably larger than offered by conventional compression methods. The inventive method is in particular useful for those images having a definite structure like the one to be found in forms. A large percentage of the documents used in the transaction of business is constituted by forms of various designs and layout, among them administrative questionnaires, checks, traffic tickets and geographical maps, to mention just a few examples.

Each original form (O), i.e. the form presented for processing, is composed of a standard or constant part (CF) which is recurrent in every form of its kind, and a variable part (VP), i.e. the information which is filled in to complete the form. Thus, in mathematical notation, $$O = CP \cup VP.$$

where both CP and VP are bilevel images and $\cup$ denotes a per pixel union operation such that a pixel in O is black if the corresponding pixel in either CP or VP (or both) is black).

The variable part VP generally differs from one form to another. Regarding the information contained in a great number of forms having the same constant part (CP), it is immediately obvious that it is sufficient to have one single copy of the constant part of that type of form, and one copy of each variable part (VP), i.e. as many variable parts as there are individual forms of that particular type of form. Accordingly, each type of form can be stored efficiently by storing its CP, and the lot of individual forms of that type of form can be stored by just storing their respective variable parts (VP). Actually, this approach is employed frequently in the management of electronic forms.

While this is a simple idea, the question is how the idea can be applied to the vast number of paper forms which must be treated as binary images. One possible solution would be to print the basic pattern of lines, boxes and test of these forms using a special color ink which is transparent to conventional scanners. If a completed form of this type is scanned, the basic pattern (i.e. CP) would be invisible to the scanner, and only the variable part VP would be entered into the computer. Considerable effort has been devoted to the development of a practical implementation of this approach as communicated by D. E. Nielsen, R. B. Arps and T. H.

Morin, "Evaluation of Scanner Spectral Response for Insurance Industry Documents", 16/A44 NCl Program, Working Paper No. 2, May 1973, and F. B. Woods and R. B. Arps, "Evaluation of Scanner Spectral Response for Insurance Industry Documents", 16/A44 NCl Program, Working Paper No. 4, Sept. 1973. The obvious disadvantage of this approach is that the use of special-ink-sensitive scanners would exclude the application of this approach to existing archices. Also, the use of special ink is certainly more cumbersome and costly.

Accordingly, it is an object of this invention to propose an efficient method to digitize the information content of forms, including those in existing archives.

The basic idea is to first scan an empty form to obtain the constant part CP and to store this in a memory. In this way, a library of possible empty forms of interest in a particular application can be generated. As a completed form is presented to the system, it is scanned, digitized, and the resulting binary information stored. Then the respective CP of the form scanned is identified and "subtracted" from the binary information of the completed form. The difference thus obtained is the variable part VP, i.e. the information of interest. This will usually comprise only a fraction of the data of the completed form.

Further compression by conventional means is possible, and the final storage will be very efficient.

For reconstruction, the compressed data is retrieved from storage, decompressed as usual, and then convolved with the data representing CP. However, in most cases, the further processing will involve only the variable part VP.

The method in accordance with this invention is directed to compressing, for storage or transmission, the information contained in filled-in forms (O) by separate handling of the corresponding empty forms (CP) and of the information written into them (VP), and involves the steps of pre-scanning the empty forms (CP), digitizing the data obtained, and storing the digitized representations relating to each of the empty forms (CP) in a computer memory to create a forms library, scanning the original, filled-in form (O) to be compressed, digitizing the data obtained, identifying the particular one of said empty forms (CP) in said forms library and retrieving the digital representation thereof, subtracting said retrieved representation of the empty form (CP) from said digital representation of the scanned filled-in form (O), the difference being the digital representation of the filled-in information (VP), and compressing the digital representation of the filled-in information (VP) by conventional methods.

Details of the inventive method will hereafter be described by way of example and with reference to the drawings in which:

FIG. 7 represents a complete, filled-in form;

FIG. 8 represents the result of scanning the corresponding empty form $\overline{CP}$;

FIG. 9 shows the result of a straightforward subtraction of the images of FIGS. 7 and 8;

FIG. 10 shows the result of the application of the method in accordance with the invention to FIGS. 7 and 8;

FIG. 11 represents a reconstruction of the filled-in form from FIGS. 8 and 10.

Figure 1:
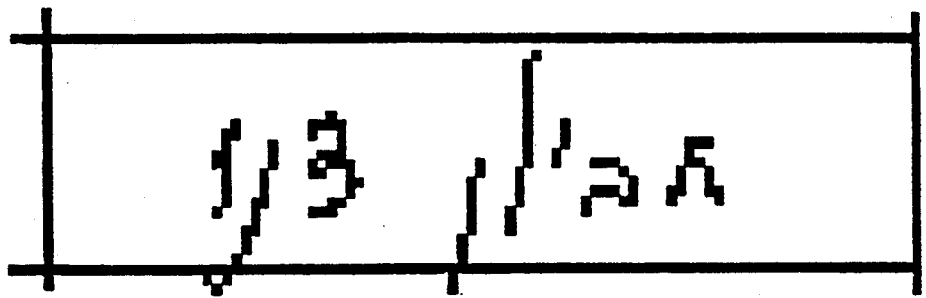
FIG. 1 represents a portion of an original filled-in form as it was scanned and stored in a computer memory (at enlarged scale)

The method in accordance with the invention comprises essentially four stages, viz. the acquisition of the information, the registration of the pre-stored data with the scanned data, the "subtraction" process, and the compression. An additional stage would be the reconstruction of the original completed form.

The acquisition of the image information has to take into account that the brightness parameters for the constant and variables parts of the form may differ significantly: The hand-written variable part is usually heavier than the printed lines and text of the constant part CP. Therefore, the scanning parameters should be optimized separately for the CP and VP parts. The scanning itself is standard; the scanning device may be a conventional scanner or a digitizing video camera. The scanning is performed line by line, with a resolution on the order of 100 picture elements per centimeter line length, that is, with a dot size of about 0.1 mm diameter.

The scanning results in two strings of binary data, one string representing the constant part CP (i.e. the empty form), the other representing the completed or original, scanned form $O = CP + VP$ which contains the constant part CP and the filled-in information VP. The task is then simply to extract the VP from the data representing the original form O.

In practical scanning devices, when the same form is scanned twice, the data representing the scanned forms will be slightly different owing to tiny relative displacements which result in small linear or angular misalignments and, hence, deviations in their binary scanning signals. Also, the digitization process may introduce some scaling. This observation also applies to the alignment of the empty form when scanned for storing the CP data, and to the original form O when scanned for the acquisition of the VP data. It is, therefore, necessary to register the original form O with respect to the pre-stored empty form with the CP content. This is done by optimizing the parameters of a geometrical transformation capable of transforming one image onto the other. The optimization aims at rendering a certain error measure a minimum at the termination of the transformation process.

Known in the prior art are various techniques for data registration in a number of technical areas, such as pattern recognition, inspection, change detection, character recognition, etc. These techniques are disclosed in the following references: U.S. Pat. Nos. 4,028,531; 4,441,207; 4,644,582; 4,651,341; 4,654,873; 4,672,676; 4,706,296; 4,815,146; H.S. Ranganath, "Hardware Implementation of Image Registration Algorithms", Image Vision Compute, Vol. 4, No. 3, Aug. 1986, pp 151–158; and W. K. Pratt, P. J. Capitant, W. Chen, E. R. Hamilton and R. H. Wallis, "Combined Symbol Matching Facsimile Data Compression System", Proc. IEEE, Vol. 68, No. 7, July 1980; B. Silverman, "Algorithm for Fast Digital Image Registration", IBM Technical Disclosure Bulletin, 1971, pp. 1291–1294. Some of the known techniques warrant a brief resume.

In accordance with the Least Squares (LS) or Least Absolute Value (LAV) approach of the last-mentioned reference, one has the take either the square or the absolute value of the difference between a transformed current image and a library image, and to look for the minimum on the set of all permitted transformations.

Under the Cross Correlation scheme, one maximizes, on the set of permitted transformations, the cross correlation of a transformed current image and a library image. Under the Moments Invariance concept, one assumes that the first and second moments of an image are invariant to the translation and rotation, and one computes the eigen-vectors of a given distribution, and from these one determines the relative rotation of the two binary images.

A simple yet useful way to compute the transformation parameters is to solve a system of equations stemming from a given match between a set of points in one image and a corresponding set in the reference image. This scheme is divided into automatic point extraction and manual point extraction processes.

Unfortunately, all of the forementioned approaches tends to be computationally heavy owing to the registration being a two-dimensional problem, and the number of operations being proportional to the number of image pixels. In the case of the handling of entire forms, as in connection with this invention, where huge data arrays must be registered, the prior art techniques are prohibitive from a computational point of view. Consider, for example, a form of the A4 ($297 \times 210$ mm) size. The subsampling of this form, with a standard density of 100 pixels/cm, will yield a binary image having more than 5 million pixels. The registration process with prior art devices will require a number of computations of the same order of magnitude. This is impractical for personal computers of any present design.

In accordance with the present invention, it is proposed to solve the registration problem by means of a dimensionality reduction. This is done by projecting the image on the x- and y-axes and using the Least Absolute Value approach for registering the resulting one-dimensional histograms. Thus, a one-dimensional histogram is defined as an array having only one dimension, i.e. a vector, in contrast to an array having two or more dimensions, such as a matrix. The dimensionality reduction permits the required number of computations to be proportional to the height and to the width of the image (less than 5000 pixels for one A4 page). At the same time, the speed of the registration process will be drastically increased.

In order to make the registration process of the present invention work even for the case of slightly rotated and scaled images, the original image is partitioned into a number of relatively small overlapping segments. For each segment only a simple shift transformation is allowed. The transformation of the entire image can be represented as a combination of shifts of all of the individual segments. Naturally, the smaller the segments, the better can the scheme handle complicated transformations such as rotations. It has been found empirically that for a typical A4 form and a standard scanner, it is sufficient to have 16 blocks per page in a $4 \times 4$ arrangement.

Some degree of inter-block overlap is necessary in order to avoid the forming of undesirable white schisms separating the blocks which may otherwise be caused by differences in shift among the segments. On the other hand, an increase in he overlap margin reduces the flexibility of the transformation. It was found experimentally that an overlap by two pixels works well in the majority of practical applications.

The generation of the x- and y-histograms will now be explained. To generate the y-histogram, for each segment a vector containing in its $i^{th}$ component the number of black pixels of the corresponding line is constructed. This is done efficiently by scanning each line byte-wise, without unpacking the bytes to their pixels. The number of "1"s in the current byte is obtained by means of an appropriate look-up table, e.g., one having 256 entries and 9 outputs, and added to the running sum. This process yields the number of black pixels in each line.

The y-histogram is then registered one-dimensionally using the least absolute difference as follows: The current vector, computed as explained above, is shifted for matching with respect to the library vector (which was obtained in a similar manner from the pre-stored representation of the empty form). The shifting of the current vector is performed by the machine shift command either to the left or to the right by as many places as necessary. For each shift, the absolute difference is computed. The difference being a minimum indicates the optimum shift which will be used subsequently as the relative displacement of the corresponding segments.

The generation of the x-histogram is performed similarly: For each segment a vector containing in its $i^{th}$ component the number of black pixels of the corresponding column is constructed. This is done efficiently by scanning each line byte-wise, without unpacking the bytes to their pixels. Obviously, different action needs to be taken for each byte. For each one of the $2^8$ possible bytes, an appropriate short program is prepared in advance. Also, a look-up table with 256 entries and out output for each entry giving the address of the corresponding part of the program is provided. For each byte, one proceeds to one of the 256 program sections of the look-up table, the appropriate section being chosen on the basis of the binary value of the given byte so that the $i^{th}$ component of the histogram vector is increased only if the corresponding pixel is black.

This may be illustrated by the following example: Assuming that the current byte is 10000000. Clearly, a 1 should be added to the histogram at the place corresponding to the first pixel, leaving the remaining seven pixels unaffected. Going into the look-up table to the line corresponding to the byte 1000000, we find the appropriate address. At that address we find the required short program, which is executed, and we return to the next byte. This procedure ensures that the required number of operations will be proportional to the number of black pixels (this is typically less than 10% of the total number of pixels).

The x-histogram is then one-dimensionally registered using the least mean absolute difference, much in the same way as explained above in connection with the registration of the y-histogram.

The above-described procedure for the computation of the optimum translation parameters is repeated for each segment of the image. There is a need, however, to verify the consistency of the results computed for different blocks. This task is performed by a displacement control module having a twofold purpose: (1) Detect any registration errors. This can, for example, be done by computing the average of the shifts of the eight nearest segments. If the difference between any two results exceeds a certain threshold, e.g. 4, then the normal registration may be assumed to have failed, and the displacement control unit should take over. (2) Estimate the shift parameter for blocks where the normal procedure fails owing to a lack of information. This can occur where an empty form in a given segment has no black pixel. In this case the appropriate shift is estimated on the basis of the shift parameters computed for the nearest neighbours.

Once the optimum shifts are established, each segment is placed in the appropriate area of the output image array. The output image array is the place in the memory where the result of the registration process is created. The segments of the scanned image are placed there at their associated locations after the respective shifts have been performed.

The placement in the direction of the y-axis can be controlled by a simple choice of the displacement index. Assume, for example, that the segment under consideration starts at line 100 of the scanned image, and that after comparison with the corresponding segment in the forms library it is determined that an upward shift of 5 should be performed. This means that the segment under consideration should be added to the output image array starting from line 95. In view of the fact that virtually all computers work in the indexing mode (i.e. all memory addresses are written relative to a certain displace index, whereby the absolute memory location is obtained by summing relative address and displace index), shift of the entire segment in y-direction can be performed by changing a single register value, viz. the value of the index.

It is somewhat more difficult to control the placement in the direction of the x-axis. Here it might be necessary to actually shift the data the appropriate number of places (from 1 to 7). In this manner it is possible to obtain the output array without having to unpack the data to the bit form and back to the byte form.

As explained above, the segmentation of the scanned image is performed with a little overlap. Also, the mutual shifting of the individual segments may cause some overlap. Yet we are interested in a smooth output image with no visible traces of the segmentation procedure. Obviously, those pixels in the output image array which are affected by more than one segment of the scanned image need special treatment. The preferred solution is to perform a Boolean OR operation on all segments involved. The recommended procedure is to first clear the output image array and then process the scanned image segment by segment. Each new segment is added to the output array at the appropriate location by performing an OR operation for each pixel.

As mentioned above, one of the steps of the method in accordance with the invention calls for the registration of two one-dimensional arrays, viz. the x-and y-histograms. One possibility of implementation is by way of the known Least Absolute Value (LAV) approach. However, there are other approaches available which may be more advantageous depending on the circumstances, such as the conventional Cross Correlation (CC) approach. The latter is indeed advantageous in terms of performance, but it is also much more complex from the computation point of view.

This computational complexity can often be reduced by a comparison of the relative locations of the peaks on the two histograms involved, i.e., where the histograms are maximum. For example, if the first histogram has a maximum value of 100 at location 10, and the second histogram has its maximum at location 20, then a shift of 10 would yield an acceptable match between the two histograms, at very low computational expense.

While the registration procedure has been explained in connection with binary images, i.e. images having black and white components only, it may be applied to grey level images as well. To this end, the grey level image is converted to its binary counterpart by thresholding the image or its gradient version, and then calculating the transformation parameters in the manner explained above. The histogram projections may be calculated directly from the grey level image by summing all the grey levels of the pixels in a given line (or column).

Assuming that the registration of the scanned image O with the pre-stored image CP has successfully been completed, the next step to be performed would be the subtraction of the constant part CP from the original image O. Unfortunately, in the great majority of practical cases, the scanning of the original image O as well as the retrieval of the pre-stored data representing the constant part CP introduce noise (in addition to the noise stemming, e.g. from uncleanliness or crumpling of the form). Accordingly, the straightforward subtraction would not yield the desired result, as can be seen from a comparison of FIGS. 1 through 3 which respectively show the original filled form O, the empty form CP and their straightforward difference. Of course, the aim is to remove the scanning noise, in the case of FIG. 3 it is the faint remainder of the box surrounding the handwritten portion.

A method to do this will have to (1) remove from the original O as many black (i.e. equal to 1) pixels of the constant part CP as possible; and (2) leave unaltered all the pixels which belong to the variable part VP.

Clearly, it is relatively easy to achieve one of these goals at the expense of the other. Conventional solutions fail to achieve both goals at the same time. The method of the present invention starts from the work of W. K. Pratt, P. J. Capitant, W. Chen, E. R. Hamilton and R. H. Wallis, "Combined Symbol Matching Facsimile Data Compression System" Proc. IEEE, Vol. 68, No. 7, pp. 786-796, July 1980. Their approach was to obtain an estimate $P_{VP}$ of the variable part VP by $$P_{\widetilde{VP}} = O - (P_{CP}) \qquad [1]$$

or, stated differently,
$$P_{\widetilde{VP}} = O \cap (P_{\widetilde{CP}})', \qquad [2]$$

where $\cap$ denotes intersection, and the symbol ' denotes logical negotation. In this case, goal (2) would be fulfilled completely. However, since a lot of black CP pixels are located in the vicinity of $P_{CP}$, but not on $P_{CP}$ itself, a considerable number of pixels belonging to CP will remain in $P_{VP}$. As a result, $P_{VP}$ will be "larger" than VP. This effect is, of course, undesirable because in the context of our image compression it means that the compression of $P_{VP}$ will require many more bits of code than is necessary to represent VP.

Because of this drawback, Duda and Hart, "Pattern Classification and Schene Analysis", Wiley & Sons, 1976, suggested to first broaden $P_{CP}$. In the broadened versin, BCP, one sets to "1" all the pixels such that in their vicinity there is at least one black pixel of $R_{CP}$. With the broadened procedure, $P_{VP}$ is obtained as:

$$P_{\overline{VP}} = O - BCP = O \cap \overline{BCP} \qquad [3]$$

With this approach, provided the broadening process was wide enough, it is possible to remove the entire CP area. Unfortunately, however, some parts of VP are also removed. This occurs whenever CP and VP intersect. Near the intersection areas, $P_{\overline{VP}}$ will be white, that is, the corresponding pixels will be equal to 0, even if VP was black with concomitant deterioration of the image quality.

The method of this invention avoids the drawbacks mentioned, i.e. it permits a good approximation of VP to be obtained, without undue compromise of either of the goals mentioned above, and with an efficiency that makes it applicable even to personal computers. At the same time, the method of the invention lends itself to an easy reconstruction of the original image O from $P_{\overline{CP}}$ and $P_{\overline{VP}}$. To this end, under the method of the invention, Equ. 1 (or 2) will be used wherever this does not cause distortion, namely where $P_{\overline{CP}}$ is black, Equ. 3 will be used where the broadened version BCP is white, and special tests will be made to determine the optimum solution in cases where CP intersects VP (problematic areas).

The original image O is scanned one pixel at a time. For each pixel P its immediate vicinity (n×n square) is considered. As many black pixels (1) of CP as possible are removed from O. If in he empty image CP a pixel is black, this might as well be white in the difference image. If in the original image O a black pixel is found far away from a black pixel belonging to the empty form, then that pixel should also be black in the difference image. If none of these alternatives applies, then move sophisticated tests must be performed.

We shall denote by $N_O$ the neighbourhood of P in O, by $N_{\overline{CP}}$ the corresponding neighbourhood of P in $P_{\overline{CP}}$, and by $N_{VP}$ the same neighbourhood in the final array $\widetilde{VP}$ (which is initially set to 0). The possible values of the pixel P in the various arrays can be as follows:

a. $P_0$ (the value of pixel P in O) is 0.

Naturally, in this case no action needs to be taken (i.e. no additional computations are required), and we can proceed to the next pixel.

b. $P_O = P_{\overline{CP}} = 1$

Here, the pixel P should be set to 0 (i.e. in the approximation VP the value of $P_{\overline{VP}}$ will be 0; however, since the array VP is initialized to 0, in practice, no additional action needs to be taken, and one may proceed to the next pixel.

c. $P_O = 1$, and $P_{\overline{VP}} = 0$.

In this problematic case, it is necessary to consider not only the values of P but also the values of pixels located in its vicinity. The determination of the desired value of $P_{\overline{VP}}$ can be based on the following tests:

1. Check whether P can belong to CP. If the answer is negative, then set $P_{\overline{VP}} = 1$, and proceed to the next pixel. If the answer is positive, proceed to the next test (c.2.).

The checking can be done by verifying whether the entire window $N_{CP}$ vanishes or, in general, whether the number of black pixels in $N_{CP}$ does exceed a predetermined threshold. Indeed, if the vicinity of P in CP is empty, then the black pixel in O could not have resulted from the distortion of CP and, accordingly, it must belong to VP.

2. Check whether P is connected to VP. If the answer is positive, then P itself belongs to VP, and $P_{VP}$ should be set to "1". If the answer is negative, then the conclusion will be that P belongs to CP and, accordingly, $P_{VP} = 0$.

In order to determine whether P is connected to VP, one must known $N_{VP}$. In other words, in order to be able to compute $P_{VP}$, one must know VP for all pixels in the vicinity of P. Of course, in practical cases, however, only part of $N_{VP}$ will be known, viz. the part which was already traversed in the past so that its corresponding estimate of VP is already known. Accordingly, in the connectivity test, instead of the actual $N_{VP}$, an array N will have to be used which by itself is a "first order" approximation of $N_{VP}$. This can be done as follows:

a. Expand (broaden) the neighbourhood $N_{CP}$ by a factor of m.

This, in turn, can be achieved by shifting $N_{CP}$ to the left, to the right, up and down. Then the broadened version $BN1_{CP}$ will be obtained by Boolean summation of all five of the beforementioned arrays, one original array and four shifted arrays. The broadening will be repeated on the array $BN1_{CP}$ in order to obtain $BN2_{CP}$. This process is continued until, after m steps, the final array $BNm_{CP}$ is obtained.

b. Compute the local approximation of VP as:

$$N_O - BNm_{CP} = N_0 \cap \overline{(BNm_{CP})},$$

c. Find N by combining the approximation computed above with "known" values of $N_{VP}$.

Assume, for example, that the image is traversed from left to right and from top to bottom, and that the window size is n=5. Then each of the neighbourhood arrays mentioned above will be organized as follows:

|  |  |  |  |  |
|---|---|---|---|---|
| 11 | 12 | 13 | 14 | 15 |
| 21 | 22 | 23 | 24 | 25 |
| 31 | 32 | 33 | 34 | 35 |
| 41 | 42 | 43 | 44 | 45 |
| 51 | 52 | 53 | 54 | 55 | where the number ij defines the location of the pixel in the $i^{th}$ line and in the $j^{th}$ column. Under these assumptions, the pixels 11, 12, 13, 14, 15, 21, 22, 23, 24, 25, 31, 32 of the array 0 have already been analyzed and, therefore, the appropriate values for VP have been computed. The values at the remaining locations (33, 34, 35, 41, 42, 43, 44, 45, 51, 52, 53, 54, 55) will be taken from the array computed at point b) above.

Once N is known, it is easy to determine whether the pixel P, at the center, is connected to VP. A very simple criterion may be used: if the number of black pixels in N exceeds a predetermined threshold, then the pixel P under consideration belongs to VP.

Consider now, for example, a black pixel P with a neighbourhood $N_0$ in a filled-in array, and a neighbourhood $N_{CP}$ in the empty form array.

| $N_0$ | $N_{CP}$ |
|---|---|
| 00000 | 00000 |
| 00000 | 00000 |
| 00P11 | 00111 |
| 11111 | 11111 |
| 11111 | 11111 |

This is clearly the first of the above-mentioned cases, and in the output array, P should be white (0). However, if the following happens (second case):

| $N_0$ | $N_{CP}$ |
|---|---|
| 00000 | 00000 |
| 00000 | 00000 |
| 00P11 | 00000 |
| 11111 | 00000 |
| 11111 | 00000 | then P should be left black. On the other hand, if the neighbourhood looks like this:

| $N_0$ | $N_{CP}$ |
|---|---|
| 00000 | 00000 |
| 00000 | 00000 |
| 00P00 | 00000 |
| 11111 | 11111 |
| 11111 | 11111 | then a more sophisticated test is necessary in order to determine whether P resulted from the noise at the bottom of $N_{CP}$ (and, hence, should be set to 0 at the output array), or P is black because it belongs to a line which was filled in (and, therefore, in the output image must be set to 1). In the last example above, the decision would be to set P to 0. However, in the following example, it would be more reasonable to decide for $P=1$:

| $N_0$ | $N_{CP}$ |
|---|---|
| 00001 | 00000 |
| 00010 | 00000 |
| 00P00 | 00000 |
| 11111 | 11111 |
| 11111 | 11111 |

Figure 2:
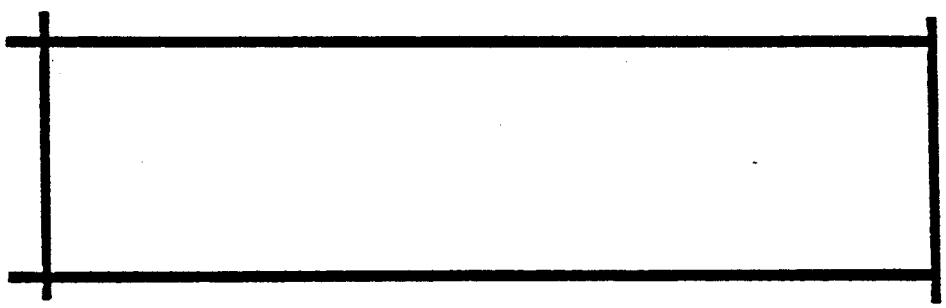
FIG. 2 represents the corresponding portion of the empty form.
Figure 3:
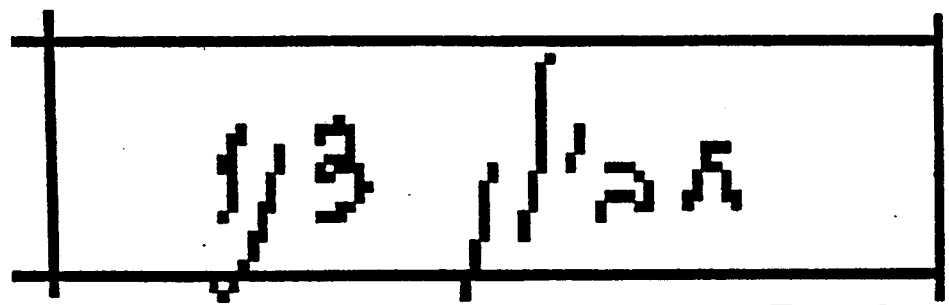
FIG. 3 depicts the result of the registration process.

The performance of the method in accordance with the invention will now be described with reference to the drawings. By way of example, a small part of the original form O is shown at enlarged scale in FIG. 1. It comprises a box from the pattern of boxes which make up the form, and some handwritten entry into that box. After the appropriate empty form was identified in the storage, its binary representation is retrieved. The corresponding output is shown in FIG. 2. Besides some deviations in line thickness and continuity, the representation of the empty form appears grossly misaligned with the representation of the original form of FIG. 1. With the registration process performed, the images are made to be almost exactly superimposed as shown in FIG. 3.

Figure 4:
FIG. 4 shows the result of a straightforward subtraction of the images of FIGS. 1 and 2.

Now the data representing the empty form CP are subtracted from the data representing the original form O. The result of a straightform subtraction is shown in FIG. 4. As already mentioned above, the scanning process is prone to introduce some noise, and this is seen in FIG. 4 as a remaining silhouette or shadow of the box shown in FIG. 2. It should be noted that FIG. 4 was only created to illustrate the subtraction, it is not normally generated. The application of the subtraction process in accordance with the invention will yield the result shown in FIG. 5, where no trace of the constant part CP of the originally scanned form O remains.

Figure 5:
FIG. 5 shows the filled-in portion of the original form with all traces of the empty form removed.
Figure 6:
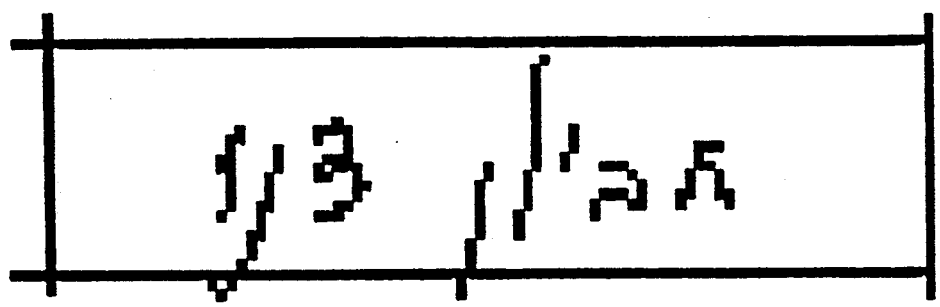
FIG. 6 depicts the recombination of the filled-in information of FIG. 5 with the empty form of FIG. 2.

FIG. 6 is the result one would see at the end of the process, i.e. it represents a recombination of the empty form CP of FIG. 2 with the filled-in portion of FIG. 5. As desired, the image of FIG. 6 looks essentially the same as the original of FIG. 1 although, of course, on a pixel-by-pixel basis, the images are different.

Figure 7:
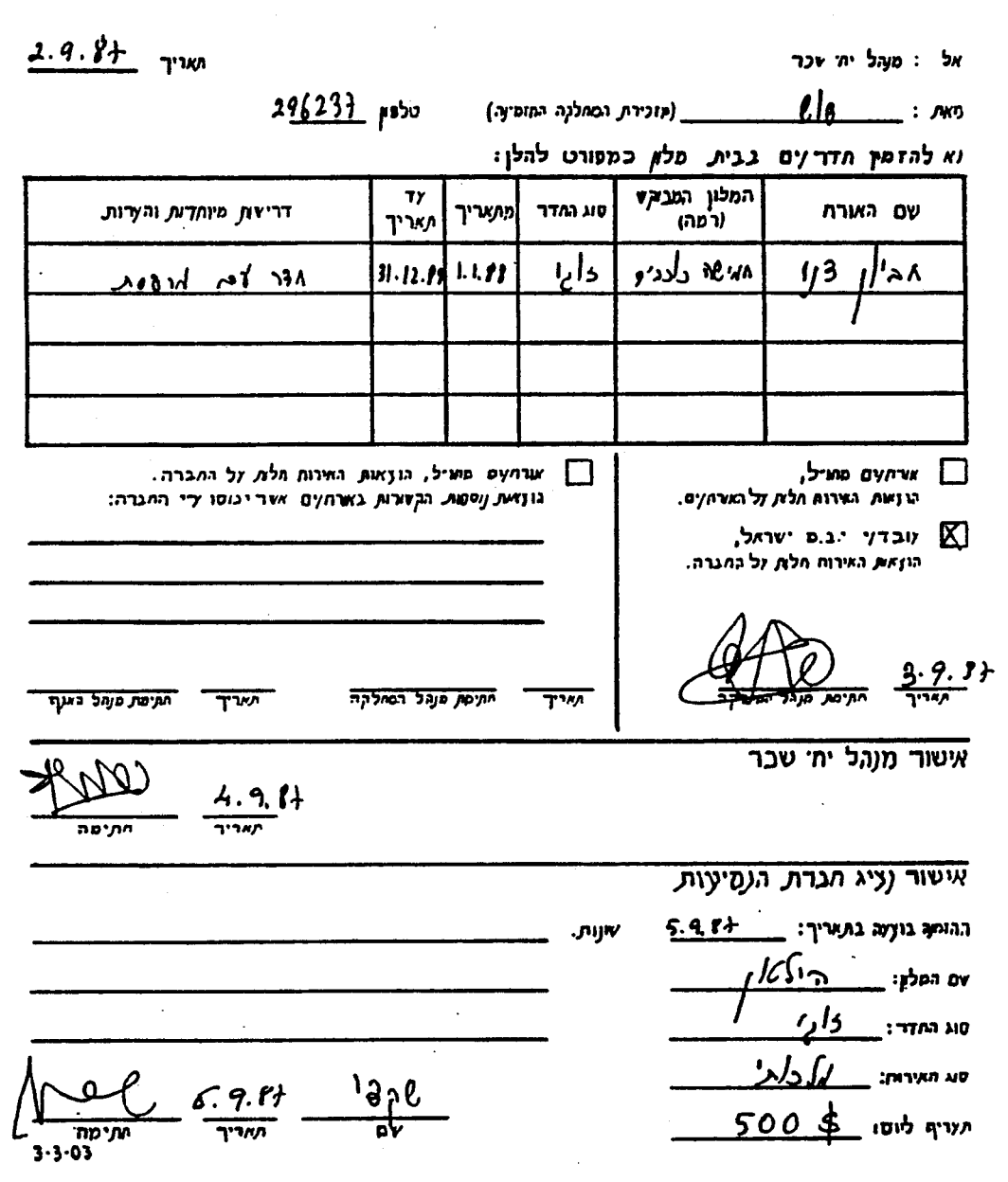
Figure 9:
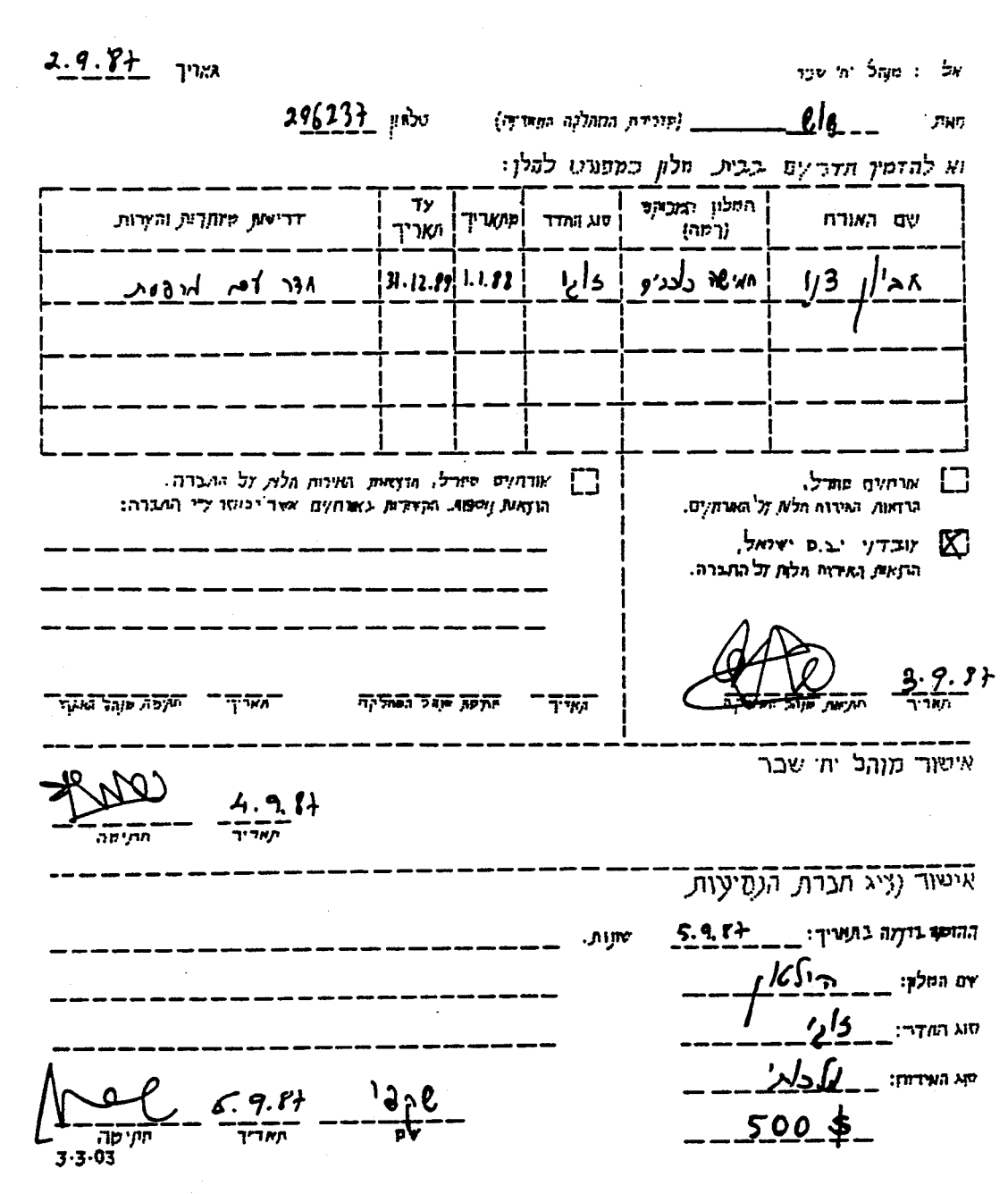

FIG. 7 is a representation of the entire original form (CP) from which the portion of FIG. 1 was taken. This form with its Hebrew text has been chosen on purpose so that the readers, most of which are assumed not to be able to read Hebrew, may view this as an example of an abstract binary image. This image is scanned, and from the resulting data subtracted in a straightforward manner i.e. in accordance with Equ. [1] are the data prestored for the corresponding empty form of FIG. 8 after the appropriate registration process has been completed. The result is shown in FIG. 9. Clearly, in the framework of the present invention, this would not be acceptable as the image contains a great deal of undesired information, such as black pixels which result from the imperfect removal of CP. This shows that, as previously pointed out, straightforward subtraction does not yield acceptable results.

Figure 10:
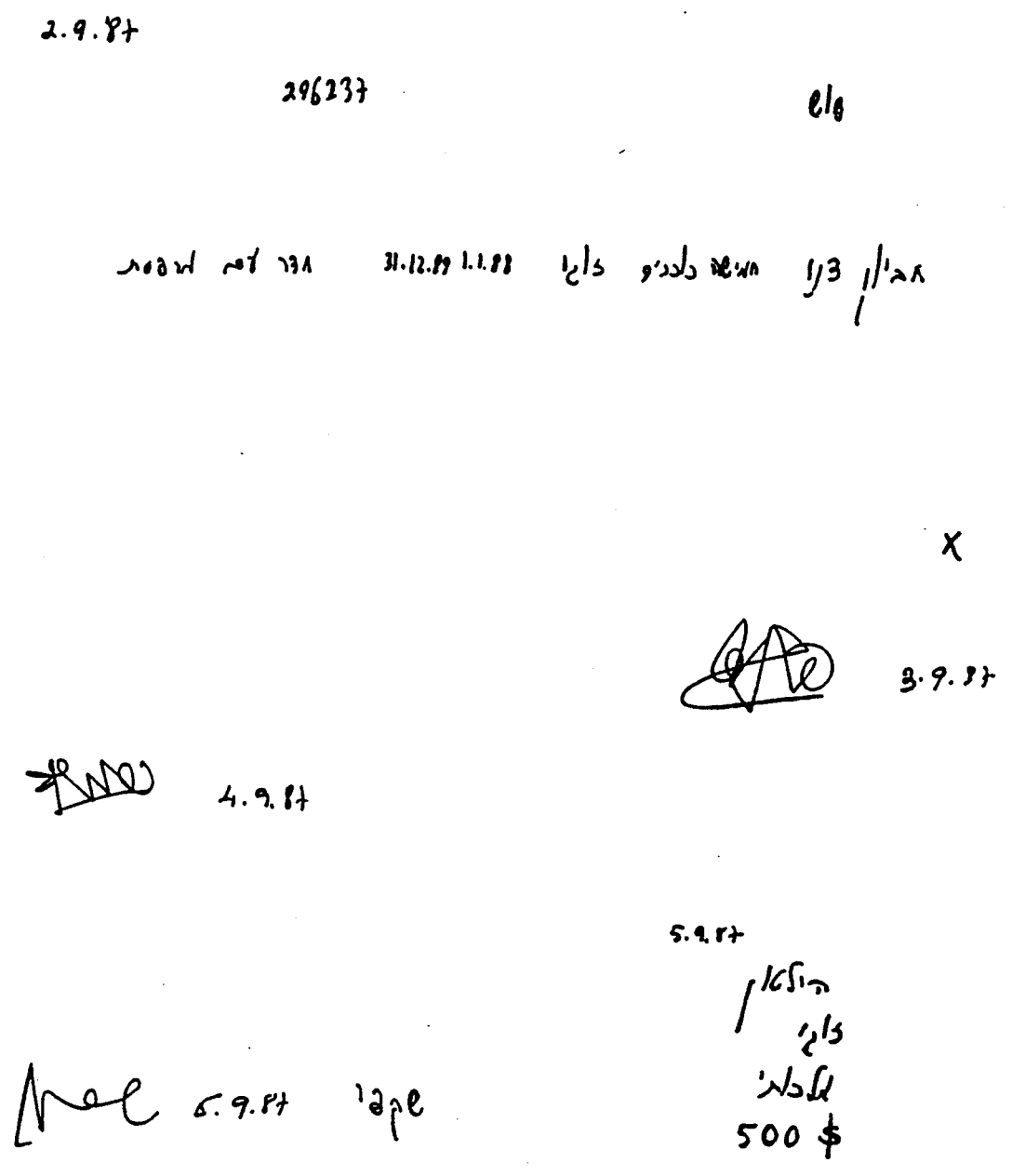
Figure 11:
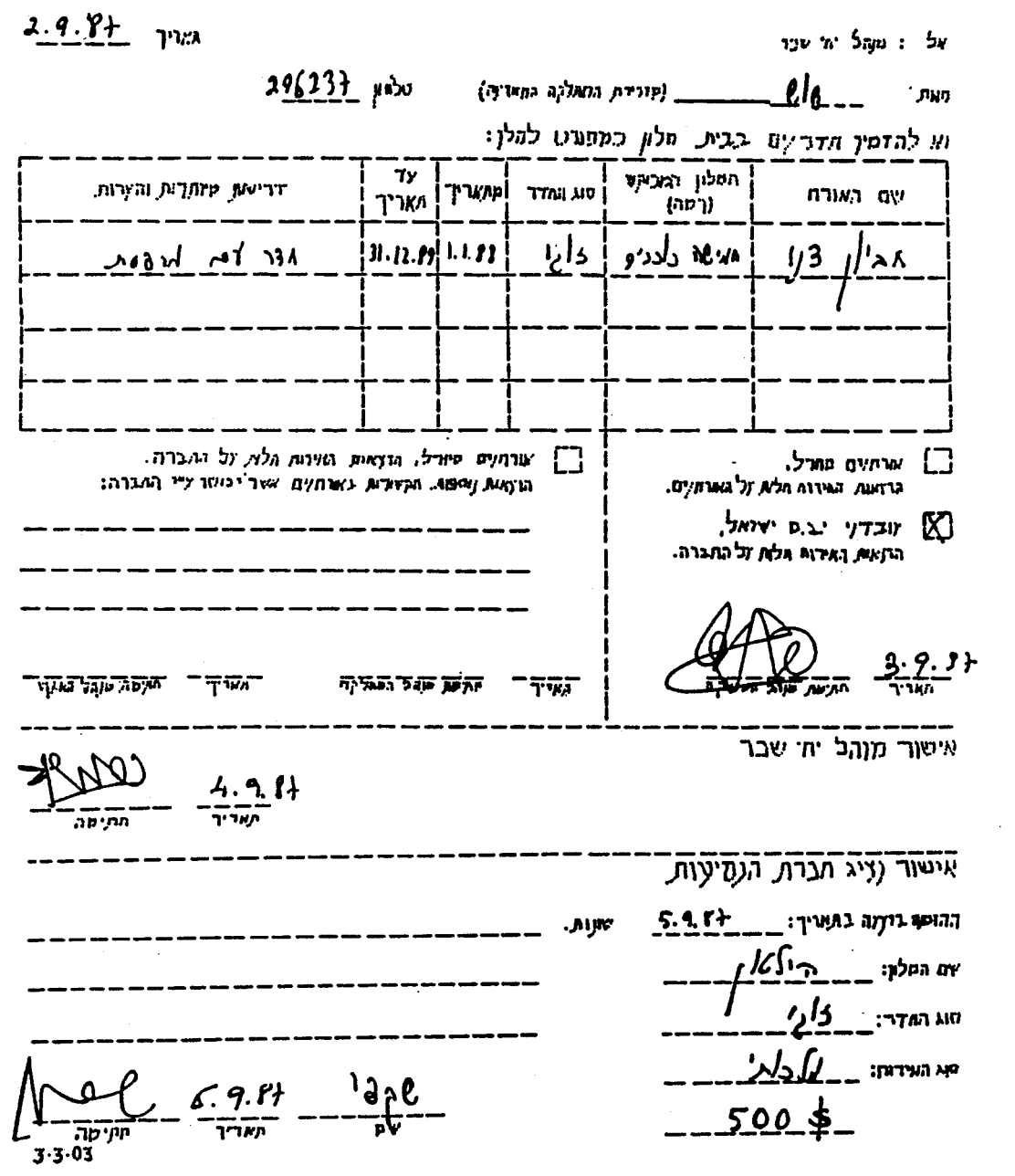

With the subtraction scheme of the present invention, the result of the subtraction will look like FIG. 10: The information content of the empty form CP has entirely been removed. Where a black pixels of the empty form CP happens to overlap a black pixel belonging to the handwritten information, it may occur that the pixel is replaced by a white pixel visible as a "black" in FIG. 10. In order to check whether the change detection process might have introduced noise, such as a distortion of VP, for example, one may wish to combine the empty form of FIG. 8 and the "change image" of FIG. 10. The result is shown in FIG. 11. While there are a few visible dicontinuities, the match may be considered to be nearly perfect since the readability of the text is not impaired.

The method of the invention, thus, permits complete removal of the constant part CP of the original image and obtaining an undistorted image of the variable part VP of the original image. Consequently, it will not be necessary to store the entire original form with its information content on the order of 30 kBytes; it will rather suffice to store the image of FIG. 8 having an information content of only about 6 kBytes, thus achieving a 5-fold compression ratio with practically no image quality deterioration. The compression of the variable part VP of the image may be made with conventional methods.

The compression step may also be performed with a more elegant scheme than those known in the art. The preferred scheme involves the application of at least two different compression ratios depending on the "density" of the information to be compressed. Assuming, for example, a two-ratio compression scheme, the first ratio may be termed "lossless" and the second "lossy". Accordingly, those portions of the data to be compressed that are very dense, i.e. that contain a comparatively great number of black pixels, will be treated with the small ratio so as not to lose any of the black pixels when compressing, while portions of the data to be compressed containing comparatively few black pixels are treated with a large compression ratio with the accepted possibility that a few pixels that are in fact relevant to the information content may be lost.

This scheme, therefore, requires a pre-filtering step to determine the dense and less dense portions of the image in order to control the application of the lossless or lossy compression ratios. Applied to the processing of forms containing information of a constant, i.e. preprinted nature, and of a variable, i.e. handwritten nature, a very considerable saving in terms of bandwidth and storage space can be achieved since the handwritten portion usually qualifies for a great compression ratio.

We claim:

1. Method for compressing, for storing or transmitting, information contained in filled-in forms by separate handling of the corresponding empty forms and of the information written into them, characterized by the steps of:

pre-scanning the empty forms, digitizing data obtained, and storing digitized representations relating to each of the empty forms in a computer memory to create a form library, scanning the original, filled-in form to be compressed, digitizing data obtained from the filled in form, identifying a particular one of said empty forms in said forms library and retrieving the digital representation thereof, subtracting said retrieved digital representation of the empty form from said digital representation of the scanned filled-in form, to generate a difference which is a digital representation of the filled-in information, and compressing the digital representation of the filled-in information.

2. Method in accordance with claim 1, characterized in that scanning parameters, such as brightness and threshold level, are determined separately for the empty form and for said original filled-in form.

3. Method in accordance with claim 1, characterized in that prior to the subtraction step, registration information relating to relative position of the filled-in information with respect to the completed form determined and registration of said original filled-in form with said empty form is performed.

4. Method in accordance with claim 1, characterized in that said subtraction step involves removing, from the original filled-in form, all black pixels which belong to said corresponding empty form or which are located close to black pixels belonging to said corresponding empty form, and retaining all black pixels which belong to said filled-in information.

5. Method in accordance with claim 1, characterized in that said compression step involves all application of at least two different compression ratios depending on a content, in the data to be compressed, of portions containing a comparatively large number of black pixels and portions containing a comparatively small number of black pixels, with the data to be compressed being first subjected to a pre-filtering step to determined a relative compressibility thereof.

6. Method for compressing, for storing or transmitting, information contained in filled-in forms by separate handling of empty forms and of information written into them, characterized by the steps of:

pre-scanning the empty forms, digitalizing data obtained by pre-scanning the empty forms, and storing the digitized representations relating to each of the empty forms in a computer memory to create a forms library;

scanning an original, filled-in form to be compressed, digitizing data obtained from scanning the filled-in form, identifying a particular one of said empty forms in said forms library and retrieving a digital representation thereof;

using dimensionality reduction to determine registration information relating to relative position of the filled-in information with respect to the competed form;

registering said original filled-in form with said empty form;

subtracting said retrieved representation of the empty form from said digital representation of the scanned filled-in form, a difference being the digital representation of the filled-in information, and compressing the digital representation of the filled-in information.

7. Method for compressing, for storing or transmitting, and reproducing information contained in filled-in forms by separate handling of corresponding empty forms and of information written into them, characterized by the steps of:

(a) storing digitized representations of empty forms in a computer memory to create a forms library;

(b) scanning an original, filed in form to be compressed;

(c) digitizing data obtained from said filled-in form;

(d) identifying the particular one of said empty forms in said forms library and retrieving the digital representation thereof;

(e) subtracting said retrieved digital representation of the empty form from said digital representation of the scanned filled-in form, to generate a difference which is a digital representation of the filled-in information, and (f) compressing the digital representation of the filled-in information.

8. The method set forth in claim 7 further including the steps of:

(h) correlating the digital representation of the filled-in information (VP) and the particular one of said empty form to reconstruct the original completed form.

9. Method for compressing, for storing, or transmitting, information contained in filled-in forms by separate handling of corresponding empty forms and of information written into them, characterized by the steps of:

pre-scanning the empty forms, digitizing data obtained from pre-scanning the empty forms, and storing a digitized representations relating to each of the empty forms in a computer memory to create a forms library;

scanning an original, filled-in form to be compressed, digitizing data obtained from scanning the filled in form;

identifying a particular one of said empty forms in said forms library and retrieving the digital representation thereof;

determining registration information relating to a relative position of the filled-in information with respect to a completed form;

partitioning the scanned filled-in form into small segments;

estimating, for each segment, optimum shifts to be performed in x and y directions;

placing each segment of said original filled-in form at an appropriate area of an output image array using the shift information previously established, so that a complete, shifted image is obtained when placements for all segments have been completed;

subtracting said retrieved representation of the empty form from said digital representation of the scanned filled-in form, a difference being the digital representation of the filled information, and compressing the digital representation of the filed in information.

10. Method in accordance with claim 9, characterized in that said original filed-in form is partitioned in a proportion corresponding at least approximately to 16 segments per page of 210×297 mm size.

11. Method in accordance with claim 9, characterized in that said partitioning is performed such that the segments overlap at their margins by a distance corresponding to about two pixels.

12. Method in accordance with claim 9, characterized in that said estimated optimum shifts for each pair of neighbouring segments are checked for consistency by assuring that their difference does not exceed a predetermined threshold and, if it does, automatically calling for operator intervention.

13. Method in accordance with any one of the preceding claims, characterized in that all steps are performed with a binary representations being maintained in a byte format without unpacking any of the bytes to their component pixels.

* * * * *